United States Patent [19]

Naruki

[11] Patent Number: 4,823,213
[45] Date of Patent: Apr. 18, 1989

[54] RECORDING AND REPRODUCING DISC DRIVING APPARATUS

[75] Inventor: Toshimasa Naruki, Koriyama, Japan

[73] Assignee: Mitsubishi Denki Kabushiki Kaisha, Tokyo, Japan

[21] Appl. No.: 370,034

[22] Filed: Jan. 15, 1987

[30] Foreign Application Priority Data

| Jan. 17, 1986 | [JP] | Japan | 61-7240 |
| Jan. 17, 1986 | [JP] | Japan | 61-7241 |
| Mar. 26, 1986 | [JP] | Japan | 61-67663 |
| Mar. 26, 1986 | [JP] | Japan | 61-67664 |
| Mar. 26, 1986 | [JP] | Japan | 61-67665 |
| Mar. 26, 1986 | [JP] | Japan | 61-67666 |
| Mar. 26, 1986 | [JP] | Japan | 61-67668 |
| Mar. 26, 1987 | [JP] | Japan | 61-67667 |

[51] Int. Cl.$^4$ ............... G11B 5/016; G11B 33/02
[52] U.S. Cl. .................. 360/78.12; 360/99.08; 360/106; 369/77.1
[58] Field of Search .................. 360/97–99, 360/106, 137; 369/77.1, 77.2, 75.1

[56] References Cited

U.S. PATENT DOCUMENTS

| 4,205,355 | 5/1980 | Hamanaka et al. | 360/99 |
| 4,367,502 | 1/1983 | Iftikar et al. | 360/98 |
| 4,415,940 | 11/1983 | Becker | 360/99 |
| 4,417,289 | 11/1983 | Ragle et al. | 360/98 |
| 4,553,183 | 11/1985 | Brown et al. | 360/97 |
| 4,599,666 | 7/1986 | Liu et al. | 360/97 |
| 4,639,863 | 1/1987 | Harrison et al. | 360/97 |
| 4,692,828 | 9/1987 | Noda et al. | 360/97 |
| 4,750,065 | 6/1988 | Masaki et al. | 360/99 |

FOREIGN PATENT DOCUMENTS

| 0185140 | 6/1986 | European Pat. Off. |
| 58-118001 | 7/1983 | Japan | 360/97 |
| 58-115653 | 7/1983 | Japan | 360/97 |
| 58-118066 | 7/1983 | Japan | 360/97 |
| 60-223093 | 11/1985 | Japan | 360/97 |
| 61-29474 | 2/1986 | Japan | 360/98 |
| 2074359 | 10/1981 | United Kingdom |

OTHER PUBLICATIONS

Gindi et al., "Design Considerations for the DASTEK 4830 Disk Drive," IEEE Transactions, vol. MAG-17, No. 4, Jul. 1981, pp. 1383–1386.

Primary Examiner—John H. Wolff
Assistant Examiner—Matthew J. Bussan
Attorney, Agent, or Firm—Oblon, Fisher, Spivak, McClelland & Maier

[57] ABSTRACT

A recording and reproducing disc driving apparatus has a main base which has seat portions for supporting a head, a carriage, first and second motors and a sensor and has at least one cut portion, and a sub-base for fixedly mounting the main base and having a dimension of the top surface which is the same as that of a given rectangular configuration of the driving apparatus. The at least one cut portion is formed by cutting a portion of the main base which does not contribute to support structural elements such as motors so that the top surface of the main base is smaller than that of the given rectangular configuration of the apparatus.

10 Claims, 7 Drawing Sheets

RECORDING AND REPRODUCING DISC DRIVING APPARATUS

BACKGROUND OF THE INVENTION

1. Field of the Invention

The present invention relates to a recording and reproducing disc driving apparatus.

2. Discussion of the Background

Figure 1:
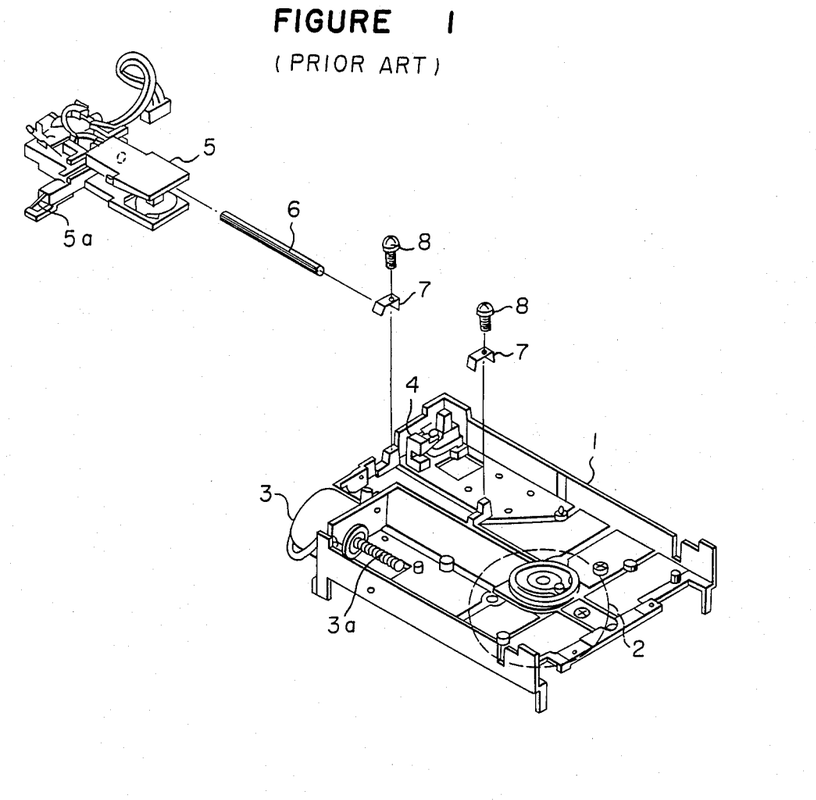
FIG. 1 is an exploded perspective view showing only important parts of a conventional recording and reproducing disc driving apparatus.

FIG. 1 is an exploded perspective view showing an important part of a conventional magnetically recording and reproducing disc driving apparatus. In FIG. 1, a reference numeral 1 designates a main base having a top surface area of the same dimension as the projection of a main body of the conventional recording and reproducing disc driving apparatus. The main base 1 supports a disc driving motor 2 (shown by a dotted line) for rotating the magnetic disc medium, a stepping motor 3 for moving a head (not shown), a sensor 4 such as a TK00 sensor for determining the position of the head, and so on. Both ends of a guide rod 6 are fixed to the main base 1 by means of two pairs of clamps 7 and bolts 8. A head carriage 5 is slidably mounted on the guide rod 6. The head carriage 5 has an extension 5a which is engaged with a screw shaft 3a connected to the stepping motor 3 so that the head carriage 5 is stepwisely moved by the rotation of the stepping motor 3.

In recent years, the recording and reproducing disc driving apparatuses have become more and more small and thin, and at the same time, the capacity of the memory has become large. On the other hand, the magnetic characteristics of magnetic disc media have improved to provide high performance and high density. With the improvement of magnetic disc media, demands on the recording and reproducing disc driving apparatus having a high track pitch and highly accurate dimensions have increased, while low manufacturing cost is required.

The magnetic disc medium is prepared by coating a magnetic layer at a thickness of about 1mm-1.3mm on the surface of a base film. The magnetic disc medium expands and contracts due to change in temperature and moisture. In order to follow such change, the main base 1 as an element of the recording and reproducing disc driving apparatus has been formed by die-casting aluminum and has been subject to fine processing. (The aluminum die-case material has substantially same thermal expansion coefficient as the magnetic disc medium.) Accordingly, the manufacturing cost for the main base is very high. Further, the disc driving motor 2 should be accurate so as to rotate the magnetic disc medium without misalignment of the axial center. Similarly, selection of material and improvement in accuracy of machining should be considered for the stepping motor 3, the head carriage 5 and the guide rod 6, which are elements that determine the position of the head.

In the conventional recording and reproducing disc driving apparatus having the construction as above-mentioned, the main base 1 is formed such that its top surface has substantially the same dimensions as the surface area of the conventional apparatus when it is viewed from the top. Accordingly, it has been difficult to manufacture the main base of a small size, small weight and at a low manufacturing cost. The conventional main base has a rectangular shape, and the size of the top surface is substantially the same as the size of the recording and reproducing disc driving unit when viewed from the top. The main base is similar to the main frame 22 disclosed in FIGS. 1 and 3 of U.S. Pat. No. 4,205,355, the housing 32 as shown in FIG. 5 of U.S. Pat. No. 4,415,940, and the chassis 103 as shown in FIGS. 9 and 10 of U.S. Pat. No. 4,417,289. Namely, the main base has a one-piece structure including element bearing parts as well as portions unnecessary to support the elements. Accordingly, it has been difficult to form a main frame of a small size and weight.

Further, major elements constituting a disc driving unit are mounted on the main base 1 which has been finely finished. As described before, since the dimension in projection from the top of the main base 1 is substantially the same as that of the main body of the recording and reproducing disc driving apparatus, the weight of the main base is greater. It has been not easy to handle and carry, and much time is needed for assembling work.

SUMMARY OF THE INVENTION

It is an object of the present invention to provide a recording and reproducing disc driving apparatus which is small in size, small in weight and can be made at low manufacturing cost.

It is an object of the present invention to provide a recording and reproducing disc driving apparatus which shortens the time for assembling work and is economical.

The recording and reproducing disc driving apparatus of the present invention is constructed in such a manner that the surface area thereof in projection from the top is made small and compact by cutting out at least one portion of the base, which portion does not contribute to the mounting of elements such as a motor constituting a disc driving unit, while leaving portions of the base which contribute to the mounting of the elements.

The main base is finely finished and has a minimum area in projection and a compact configuration. On it are mounted the major elements such as a stepping motor for moving a head, a head carriage for moving the head stepwisely by the rotation of the stepping motor, a sensor to determine the position of the head, a disc driving motor for rotating a disc, and so on, all of which should have accurate dimensions. The main base on which the elements are supported is fixed to a sub-base whose top surface area is substantially the same as that of the driving apparatus main body. The sub-base is finished relatively roughly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following, preferred embodiments of the present invention will be described with reference to the drawings.

In the recording and reproducing disc driving apparatus of the present invention, the main base is so formed that it has the minimum dimensions and volume to which the major elements may be attached, and it is finely finished. Thus formed, the small-sized main base reduces the size of the driving apparatus as a whole. The performance of the driving apparatus is determined by the assembly including the small-sized main base.

The sub-base may have substantially the same dimensions, in projection from the top, as the apparatus main body, and need not be subject to fine processing.

Further, the structural elements which are not required to be finely finished, unlike those mounted on the main base, may be attached to the sub-base.

Figures 2, 3:
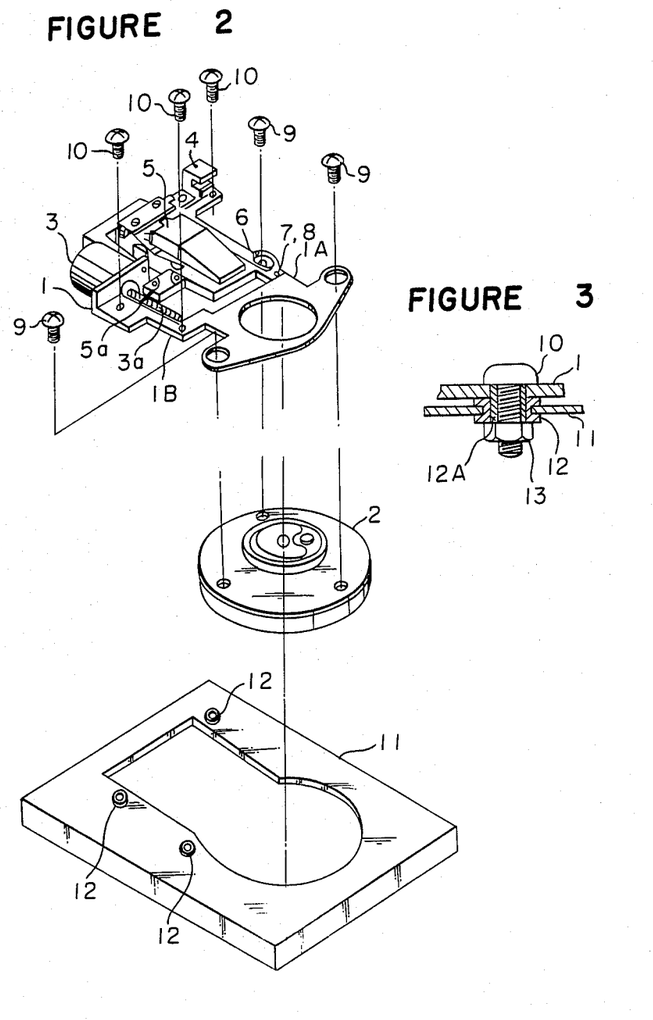
FIG. 2 is an exploded perspective view showing only important parts of an embodiment of the recording and reproducing disc driving apparatus according to the present invention.
FIG. 3 is a cross-sectional view showing a structure for connecting a main base and a sub-base shown in FIG. 2.

FIG. 2 is an exploded perspective view showing important parts of the first embodiment of the recording and reproducing disc driving apparatus according to the present invention.

In FIG. 2, a reference numeral 1 designates a main base formed, for instance, by die-casting aluminum so that it has accurate dimensions and a reduced surface area. Namely, cut portions 1A, 1B, which do not contribute to the mounting of structural elements for driving a disc (such as a disc driving motor, a stepping motor, a sensor, a head carriage, a guide rod, a clamp and so on) are removed from the main base by cutting so that the main base 1 has a minimum surface area.

The cut portions 1A, 1B are formed in the main base in such a manner that they extend near portions where bolts are inserted to connect the main base to a sub-base 11 and portions where bolts are inserted to secure the disc driving motor 2. The cut portions 1A, 1B substantially reduce the weight and the surface area of the main base.

On the main base 1 are mounted a stepping motor 3 for moving a head (not shown), a head carriage 5 stepwisely moved by the rotation of the stepping motor 3, a sensor 4 such as a TK00 sensor for detecting the position of the head, and so on. Further, both ends of a guide rod 6 carrying the head carriage 5 are fixed to the main base 1 by means of two pairs of clamps 7 and bolts 8 so that the head carriage 5 is freely movable along the guide rod 6. An extension 5a projecting from a side of the head carriage 5 is engaged with a screw shaft 3a of the stepping motor 3. The rotation of the stepping motor 3 stepwisely moves the head carriage 5. The disc driving motor 2 for rotating a magnetic disc medium (not shown) is attached to the main base 1 by means of bolts 9.

In the recording and reproducing disc driving apparatus of the present invention, the major elements for driving the disc are concentratedly mounted on the main base 1, which is thin, has a small size, and is precisely finished. The main base is fixed to the sub-base 11. The sub-base 11 is formed by pressing and punching a metal sheet or molding a synthetic resin to have substantially the same dimensions in projection from the top as that of the driving apparatus main body, and is finished relatively roughly.

FIG. 3 shows details of a construction to connect the main base 1 to the sub-base 11. The main base 1 and sub-base 11 respectively have three engaging portions. At each of the engaging portions, there is provided a fastening means consisting of a cylindrical cushion member 12 with a spacer 12A, a bolt 10 and a nut 13. When the main base 1 and the sub-base 11 are assembled, the cylindrical cushion member 12 is attached to a hole formed in the sub-base 11 and is firmly connected to the sub-base 11 so that it establishes a predetermined distance between the lower surface of the main base 1 and the upper surface of the sub-base 11. The spacer 12A is inserted in a through hole formed in the main base at a position corresponding to the through hole of the sub-base 11. The bolt 10 is put in the spacer 12A and the nut 13 is screwed onto the bolt.

In the recording and reproducing disc driving apparatus having the above-mentioned construction, the main base, which has to be accurately finished, can be formed to be of a small size and at a low manufacturing cost. Further, since the major elements for driving the disc, such as the disc driving motor 2, the stepping motor 3, the sensor 4, the head carriage 5, the guide rod 6, etc. are mounted on the main base, adjustment of the elements after assembling can be easily done and high accuracy in the assembling is obtainable. In addition, time requiring for the adjustment work can be shortened. This is advantageous from an economical viewpoint.

The sub-base 11 may be formed by, for instance, pressing a metal plate or molding a synthetic resin. Since it is not required to have accurate dimensions, the construction is split into two parts, i.e. the main base 1 and the sub-base 11. The embodiment shown in FIG. 2 is advantageous in view of manufacturing cost and assembling work in comparison with the conventional driving apparatus using the main base shown in FIG. 1. Further, according to the present invention, the size of the driving apparatus can be made small.

In the embodiment, the main base 1 is formed by die-casting aluminum. However, the main base 1 and the sub-base 11 may be formed by pressing and cutting a metal sheet as far as a product formed by such operations have accurate dimensions. The sub-base 11 may be formed by molding a synthetic resin.

Figure 4:
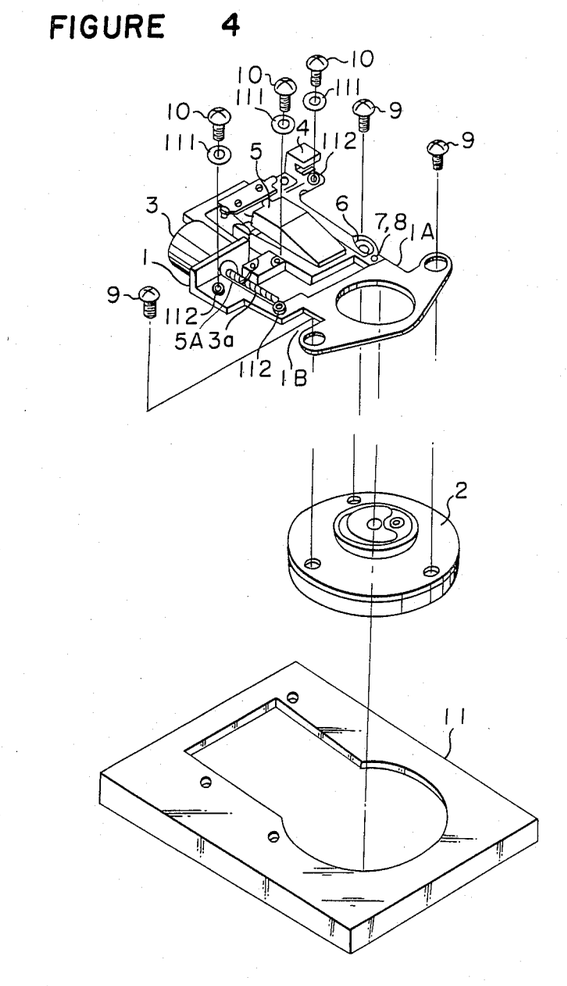
FIG. 4 is a perspective view, similar to FIG. 2, of a second embodiment according to the present invention.
Figures 5, 6:
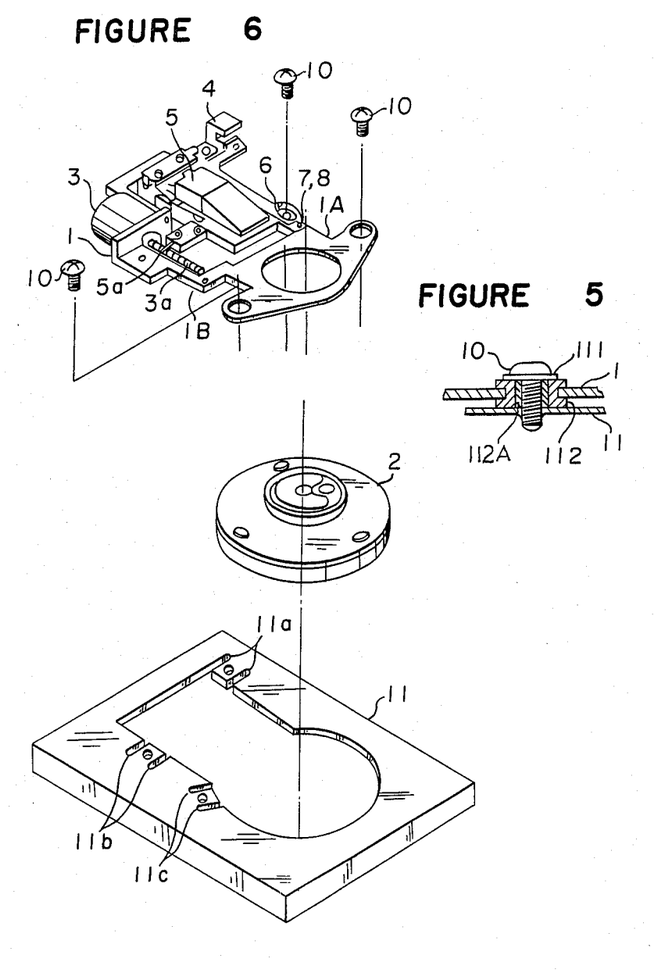
FIG. 5 is a cross-sectional view showing a structure for connecting the main base to the sub-base of the second embodiment.
FIG. 6 is a perspective view, similar to FIGS. 2 and 4, of a third embodiment of the present invention.

The cushion member serves to control the transmission of vibrations between the main base 1 and the sub-base 11. The cushion member may be attached to the main base 1. FIGS. 4 and 5 show an embodiment in which the cushion member is attached to the main base 1. Namely, a cushion member 112 with a spacer 112A is firmly connected in a through hole formed in the main base 1 in a position engageable with the sub-base 11. As shown in FIG. 5, the bolt 10 is put in the cushion member 112 through the spacer and through a washer 111 so as to engage with a threaded hole formed in the sub-base 11.

FIG. 6 shows another embodiment of the fastening means for fastening the engaging portions between the main base 1 and the sub-base 11. The embodiment shown in FIG. 6 serves to eliminate the disadvantages that, when the main base 1 is connected to the sub-base 11, there often is misalignment between the through hole in the main base 1 and the through hole or the threaded hole formed in the sub-base, because the sub-base 11 has relatively rough dimensions.

In the embodiment shown in FIG. 6, each pair of slots 11a, 11b, 11c are formed adjacent the engaging portions of the sub-base 11 to provide tongue-shaped portions for the engaging portions. Accordingly, even though there may be some deviation between the through holes in the main base 1 and the sub-base 11 in which the bolt is to be inserted, the tongue-shaped portions formed by the slots 11a, 11b, 11c permit adjustment of the position of the through holes, with the result that both bases are connectable by the bolt in an alignment condition of the holes. Accordingly, distortion of the main base 1 or the sub-base 11, which may be caused when they are connected by bolts, can be eliminated.

Figure 7:
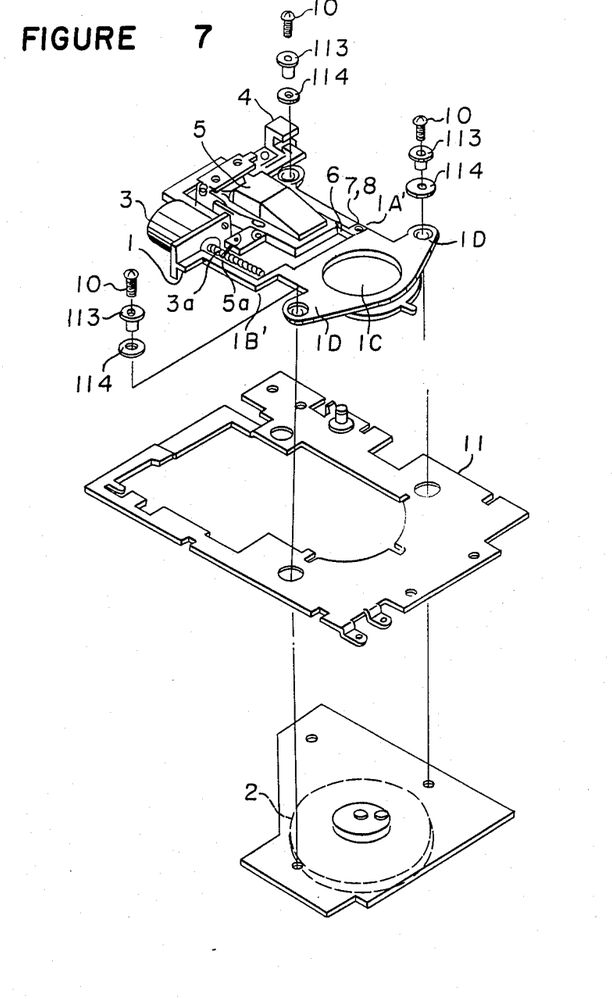
FIG. 7 is a perspective view, similar to FIGS. 2 and 4 and 6, of a fourth embodiment of the present invention.

FIG. 7 is an exploded perspective view of the fourth embodiment of the recording and reproducing disc driving apparatus of the present invention wherein the same reference numerals designate the same parts, and therefore, description of these parts is omitted.

In FIG. 7, the main base 1 is constituted by a shaped product such as an aluminum die-cast product with highly accurate dimensions and the minimum area of the top surface. The main base 1 supports the stepping motor 3 for moving the head (not shown), the head carriage 5 moved stepwisely by the rotation of the stepping motor 3, the sensor 4 such as a TK00 sensor for detecting the position of the head, etc. The head carriage 5 is slidably mounted on the main base 1 through the guide rod 6, both ends of which are fixed to the main base by means of two pairs of the clamps 7 and the bolts 8. The extension 5a of the head carriage 5 is engaged with the screw shaft 3a of the stepping motor 3 so that the head carriage 5 is moves stepwisely by the rotation of the motor 3. Thus, the major elements for driving the disc are arranged on the small-sized main base 1 having highly accurate dimensions.

A seat 1C for fitting the disc driving motor 2 is formed in the main base 1. A pair of ear portions 1D, 1D are formed at both sides of the seat 1C for fixing the driving motor 2. On the other hand, the sub-base 11 is so formed that the area and configuration of the top surface is substantially the same as those of the driving apparatus main body. The sub-base is assembled in a clamped state between the main base 1 and the disc driving motor. When assembling these members, a spacer 113 and a cushion member 114 are fitted into each of the through holes formed in the ear portions 1D, the spacer 113 and the cushion member 114 reaching the disc driving motor 2 through the aperture formed in the sub-base 11, followed by inserting the bolt 10 and screwing to the disc driving motor 2. In this embodiment, the cushion member 114 effectively acts only on the sub-base 11 for damping shocks and vibrations.

Thus, in the fourth embodiment of the recording and reproducing disc driving apparatus, the main base 1 is formed to be as small as possible in plan view. It is finished with high accuracy, and supports the major elements for driving the disc such as the stepping motor 3, the head carriage 5, the sensor 4 etc., all being required to have high accuracy. On the other hand, the sub-base 11 is formed into substantially the same dimension in plan view with respect to the driving apparatus main body. The sub-base 11 is assembled between the main base 1 and the disc driving motor 2 by means of the bolts 10, the spacers 113 and the cushion members 114. Accordingly, the configuration of the assembly can be smaller than the conventional one, and the vibrations and shocks imparted from the outside of the apparatus can be effectively reduced by the cushion members 114. The number of through holes for inserting the bolts can be reduced by half, because common bolt insertion holes are formed in the main base 1 to connect the disc driving motor 2 to the main base 1 and to connect the sub-base 11 to the main base 1. When comparing the embodiments shown in FIGS. 6 and 7 with the embodiments shown in FIGS. 2 and 4, the formed embodiments eliminate three bolt insertion holes among six bolt insertion holes which are used for connecting the disc driving motor 2 and the sub-base 11 to the main base 1 respectively. Accordingly, the third and fourth embodiments have wider cut portions 1a', 1b'. As a result, the shape of the top surface of the main base 1 is further reduced, whereby the weight and volume of the driving apparatus can be further reduced.

In the fourth embodiment in which the sub-base 11 is held between the disc driving motor 2 and the main base 1, the cushion members may be attached to the sub-base.

Figure 8:
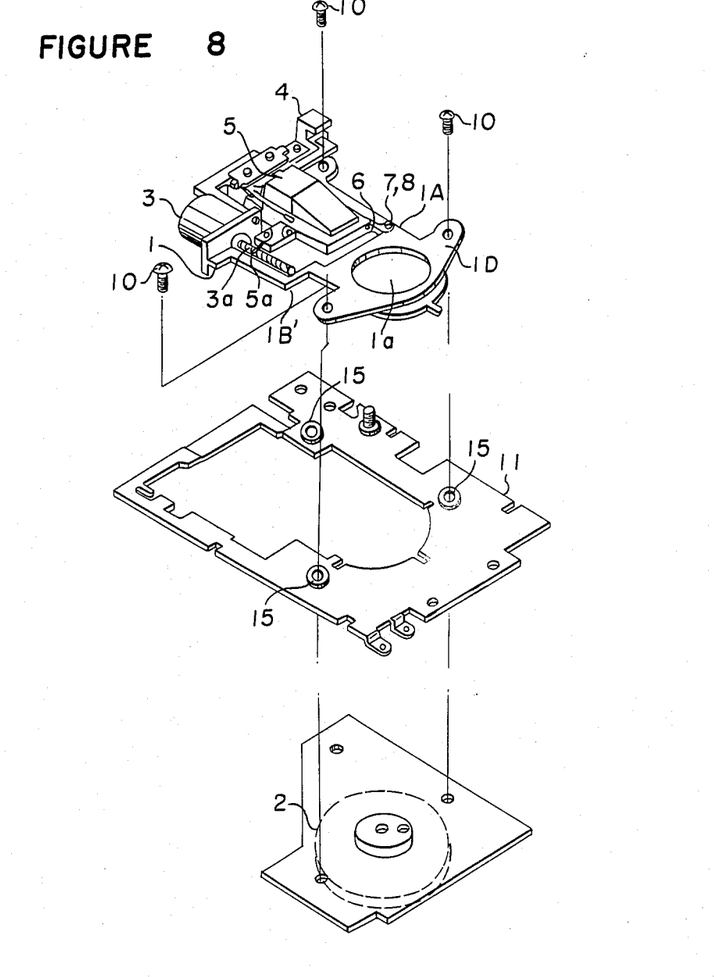
FIG. 8 is a perspective view, similar to FIGS. 2 and 4, 6 and 7, of a fifth embodiment of the present invention.

FIG. 8 shows the fifth embodiment of the present invention.

Figure 9:
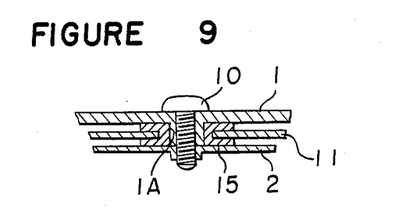
FIG. 9 is a cross-sectional view showing a structure for connecting the main base to the sub-base of the fifth embodiment.

In FIG. 8, the disc driving motor 2 is fixed to the main base 1 by inserting the bolts into through holes formed in the ear portions 1D, 1D of the main base 1. FIG. 9 is a cross-sectional view showing the fastening means for connecting the main base 1 and the disc driving motor 2 by interposing the sub-base 11 therebetween. The fastening means comprises a cushion member 15, a cylindrical spacer 1A, which may be formed integrally with the main base 1 and which determines the distance between the main base 1 and the disc driving motor 2, and a bolt 10. The cushion member 15 is disposed around the spacer 1A, and holds the sub-base 11 between the main base 1 and the motor 2 to thereby damp the vibrations and shocks imparted to the sub-base 11.

Figure 10:
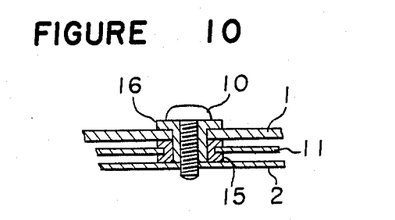
FIG. 10 is a cross-sectional view showing a structure for connecting the main base to the sub-base as shown in FIG. 8.

FIG. 10 is a cross-sectional view of another embodiment of the fastening and damping means. The construction of the fastening means is the same as that shown in FIG. 9 provided that a spacer 16 for determining the distance between the main base 1 and the disc driving motor 2 is not integral with the main base 1. The fastening means shown in FIG. 10 serves to fix the members to be connected at a proper positional relationship and provides for the function of damping.

Figure 11:
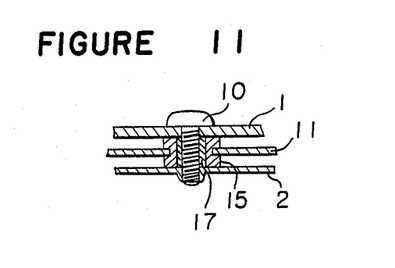
FIG. 11 is a cross-sectional view showing a shock absorbing member with a spacer which connects the main base, the sub-base and a driving motor.

The same function can be obtained by another embodiment as shown in FIG. 11 in which a spacer 17 is fixed to the inner wall of the cushion member 15.

As described above, in the recording and reproducing disc driving apparatus according to the present invention, the main base is so formed that at least one portion which does not contribute to support of the structural elements is eliminated, to reduce the surface area of the top surface. It is finished with a high accuracy and supports the stepping motor, the head carriage, the sensor, the disc driving motor, etc. The main base is connected to the sub-base having substantially same configuration when viewed from the top as the driving apparatus main body. The sub-base is not required to finished accurately. Accordingly, miniaturization, reduction in weight and manufacturing cost of the driving apparatus can be realized, and adjustment during assembly can be easy. Further, the time required for adjusting during assembly can be shortened to improve the efficiency of the assembly. In addition, the small-sized main base reduces the manufacturing cost.

The fastening means for connecting the main base and the sub-base damps the vibrations and shocks imparted from the outside of the driving apparatus, whereby performance of the driving apparatus is improved.

Obviously, numerous modifications and variations of the present invention are possible in light of the above teachings. It is therefore to be understood that within the scope of the appended claims, the invention may be practiced otherwise than as specifically described herein.

I claim:

1. A recording and reproducing disc driving apparatus having a given rectangular outer configuration when viewed from above, said apparatus comprising:
   (a) a sub-base having an outer configuration that forms said given rectangular configuration of the apparatus;
   (b) a main base fixedly mounted on said sub-base, above a top surface of said sub-base;
   (c) fastening means attaching said main base to said sub-base;
   (d) a head disposed for opposition to a data recording and reproducing disc;
   (e) a carriage mounted on said main base and supporting said head;
   (f) a first motor, mounted on said main base, for driving said carriage to move said head to desired positions with respect to a disc;
   (g) a sensor, mounted on said main base, for detecting when said head is in a desired position; and
   (h) a second motor for rotating the disc,
   wherein:
   (i) said main base has formed thereon a seat for receiving at least a portion of said second motor and a plurality of mounting openings for mounting said second motor and for mounting said main base on said sub-base;
   (j) a projection of said main base on said subbase is formed by a perimeter of said main base and fitted within said outer configuration of said subbase;
   (k) the area of said projection is smaller than the area formed by said top surface of said sub-base;
   (l) said main base has at least one cut portion formed therein such that said perimeter of said main base passes substantially adjacent to said carriage, said first motor, said sensor, said seat, and said mounting openings;
   (m) the area of said projection is substantially as small as possible for the mounting of said carriage, said first motor, and said sensor and for the provision of said seat and said mounting openings;
   (n) said main base comprises a plurality of engaging portions at its outer periphery which are engageable with a plurality of said fastening means for connecting said main base to said sub-base;
   (o) said at least one cut portion extends near said engaging portions;
   (p) said sub-base comprises a further plurality of engaging portions; and
   (q) said sub-base has slots formed therein near each of said engaging portions formed in said sub-base so that displacement in position of said engaging portions of said sub-base is allowed.

2. The recording and reproducing disc driving apparatus according to claim 1, wherein said slots are paired and formed at opposite sides of each of said engaging portions of said sub-base to provide tongue-shaped engaging portions.

3. The recording and reproducing disc driving apparatus according to claim 1, wherein:
   (a) said sub-base is held between said main base and said second motor and
   (b) said second motor is attached to said main base.

4. A recording and reproducing disc driving apparatus having a given rectangular outer configuration when viewed from above, said apparatus comprising:
   (a) a sub-base having an outer configuration that forms said given rectangular configuration of the apparatus;
   (b) a main base fixedly mounted on said sub-base, above a top surface of said sub-base;
   (c) fastening means attaching said main base to said sub-base;
   (d) a head disposed for opposition to a data recording and reproducing disc;
   (e) a carriage mounted on said main base and supporting said head;
   (f) a first motor, mounted on said main base, for driving said carriage to move said head to desired positions with respect to a disc;
   (g) a sensor, mounted on said main base, for detecting when said head is in a desired position; and
   (h) a second motor for rotating the disc,
   wherein:
   (i) said main base has formed therein a seat for receiving at least a portion of said second motor and a plurality of mounting openings for mounting said second motor and for mounting said main base on said sub-base;
   (j) a projection of said main base on said sub-base is formed by a perimeter of said main base and fitted within said outer configuration of said sub-base;
   (k) the area of said projection is smaller than the area formed by said top surface of said sub-base;
   (l) said main base has at least one cut portion formed therein such that said perimeter of said main base passes substantially adjacent to said carriage, said first motor, said sensor, said seat, and said mounting openings;
   (m) the area of said projection is substantially as small as possible for the mounting of said carriage, said first motor, and said sensor and for the provision of said seat and said mounting openings;
   (n) said sub-base is held between said main base and said second motor;
   (o) said second motor is attached to said main base;
   (p) said second motor is connected to said main base through a plurality of fastening means; and (q) said sub-base is held between said main base and said second motor by said fastening means, thereby reducing the number of mounting openings and fastening means that are required to connect said sub-base said main base, and said second motor.

5. The recording and reproducing disc driving apparatus according to claim 4, wherein:
   (a) said main base comprises a plurality of engaging portions at its outer periphery which are engageable with a plurality of said fastening means for connecting said main base to said sub-base and
   (b) said at least one cut portion extends near said engaging portions.

6. The recording and reproducing disc driving apparatus according to claim 5, wherein a shock absorbing means is placed at each of the engaging portions for connecting said main base to said sub-base to thereby control vibrations between said main base and said sub-base.

7. The recording and reproducing disc driving apparatus according to claim 4, wherein said sub-base is made of cast metal or a molded resinous material.

8. The recording and reproducing disc driving apparatus according to claim 4, wherein a shock absorbing means is provided in each of said fastening means to control vibrations between said main base and said sub-base.

9. The recording and reproducing disc driving apparatus according to claim 4, wherein a spacer is provided in each of said fastening means to keep the distance between said main base and said second motor at a given value.

10. The recording and reproducing disc driving apparatus according to claim 4, wherein said sub-base is a formed metal sheet.

* * * * *

UNITED STATES PATENT AND TRADEMARK OFFICE
CERTIFICATE OF CORRECTION

PATENT NO. : 4,823,213

DATED : APR 18, 1989

INVENTOR(S) : NARUKI, Toshimasa

It is certified that error appears in the above-identified patent and that said Letters Patent is hereby corrected as shown below:

On the title page, item [21], the serial number is incorrect, it should read as follows:

--003,455--

Signed and Sealed this

Twenty-third Day of January, 1990

Attest:

JEFFREY M. SAMUELS

Attesting Officer

Acting Commissioner of Patents and Trademarks